UNITED STATES PATENT OFFICE.

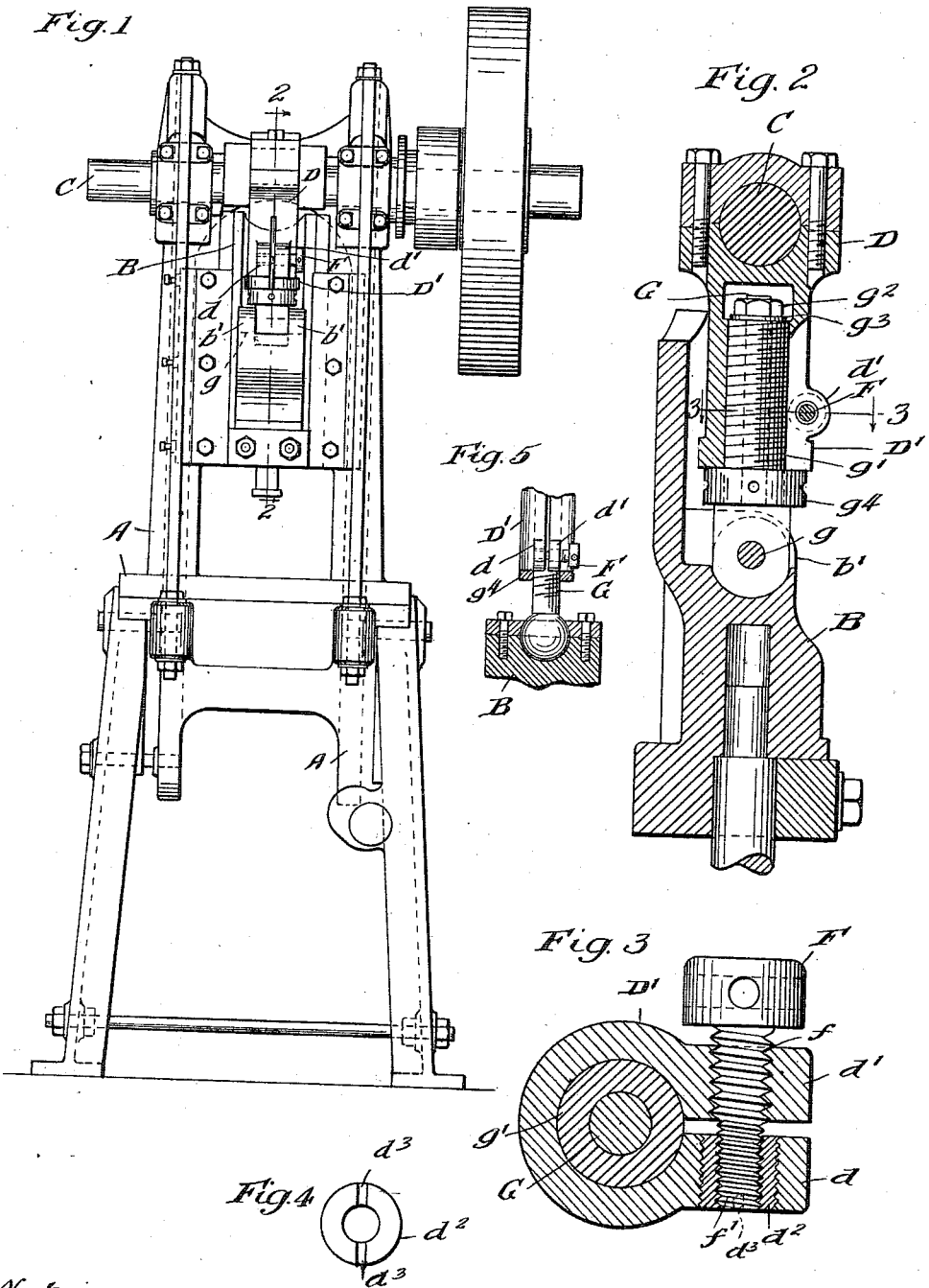

CHARLES J. NELSON, OF MAYWOOD, ILLINOIS, ASSIGNOR TO AMERICAN CAN COMPANY, OF NEW YORK, N. Y., A CORPORATION OF NEW JERSEY.

PRESS CONNECTION.

995,478.   Specification of Letters Patent.   Patented June 20, 1911.

Application filed September 7, 1909.   Serial No. 516,546.

*To all whom it may concern:*

Be it known that I, CHARLES J. NELSON, a citizen of the United States, residing in Maywood, in the county of Cook and State of Illinois, have invented a new and useful Improvement in Press Connections, of which the following is a specification.

My invention relates to improvements in press connections for connecting the crank sleeve or crank rod of drawing, stamping, punching or other presses to the cross head or slide thereof.

Heretofore, with press connections commonly in use, great difficulty is frequently experienced in loosening the connection between the crank sleeve and cross head, as the heavy blows to which the parts are subjected tend frequently to so set or jam the parts, that great force has to be applied to loosen or start the screw threads.

The object of my invention is to provide a strong, simple and efficient means for practically overcoming the difficulties heretofore experienced, and by means of which the connection may be easily and quickly loosened.

My invention consists in connection with a press cross-head of any suitable kind or construction, and a crank rod or sleeve having a split screw threaded clamping portion, and a screw threaded connecting shank embraced thereby and connected to the cross-head, of a differential clamp screw extending through the clamping arms or wings of the split or clamping portion of the crank sleeve, one of the clamp arms or wings of the clamp sleeve having a removable screw threaded bushing to receive the smaller portion or member of the differential clamp screw.

My invention also consists in the novel construction of parts and devices and in the novel combinations of parts and devices herein shown and described.

In the accompanying drawing forming a part of this specification, Figure 1 is a front elevation of a press connection embodying my invention. Fig. 2 is a section on line 2—2 of Fig. 1. Fig. 3 is a detail section on line 3—3 of Fig. 2. Fig. 4 is a detail lower end view of the removable bushing which receives the smaller portion of the differential clamp screw and Fig. 5 illustrates a modification.

In the drawing, A represents the frame of a press of any suitable kind or construction, B the cross-head, C the crank shaft, D the crank rod or sleeve having its lower portion $D^1$ split to serve as a clamp sleeve, and provided with clamp arms or wings $d\ d^1$ to receive a differential clamp screw F by which the split lower portion or clamp sleeve $D^1$ of the crank sleeve is caused to firmly embrace and clamp the connecting shank or sleeve G. The connecting shank G is preferably hinged to the cross-head B by a hinge pin $g$ which extends through lugs $b^1$ on the cross head. The hinge or joint between the shank G and the cross head may be a ball and socket joint or plain hinge pin, or any other suitable form of attachment. The connecting shank G preferably has a sleeve $g^1$ surrounding it, which is furnished with a nut $g^2$ and washer $g^3$, at the upper end, and a head $g^4$ at the lower end and upon which sleeve the clamp sleeve $D^1$ of the crank sleeve D directly acts, the sleeve $g^1$ being externally threaded and the clamp sleeve $D^1$ being internally threaded.

The differential clamp screw F which extends through the arms or wings $d\ d^1$ of the clamp sleeve $D^1$ has differential screw threads $f\ f^1$, the larger portion $f$ being threaded directly in the clamp arm or wing $d$, and the smaller portion $f^1$ of the differential screw being threaded in a removable bushing $d^2$ having internal screw threads to engage the screw threads $f^1$ of the clamp screw, and external screw threads engaging screw threads in the arm or wing $d$ in which the bushing fits. The removable bushing $d^2$ is provided with a slot $d^3$ at its lower end to receive a screw driver.

In the modification shown in Fig. 5, the connecting shank G is illustrated as being attached to the cross head by a ball and socket joint instead of a plain hinge joint.

I claim:—

1. In a press connection, the combination with a cross-head, of a crank sleeve having a split clamp sleeve portion having clamp arms furnished with screw threads of different pitches, a connecting shank embraced by said clamp sleeve and a differential clamp screw extending through the clamp arm or wings of the clamp sleeve and having external screw threads of two different pitches, those of one pitch acting upon one of said clamp arms, and those of the other pitch acting upon the other of said clamp arms, substantially as specified.

2. In a press connection, the combination with a cross-head, clamp sleeve having clamp members, one movable in respect to the other, and furnished with screw threads of different pitches and connecting shank fitting within the clamp sleeve, of a differential clamp screw having external screw threads of two different pitches, those of one pitch acting upon one of said clamp members and those of the other pitch acting upon the other of said clamp members, substantially as specified.

3. In a press connection, the combination with a cross-head, of a clamp sleeve having clamp arms and furnished with screw threads of different pitches and one movable in respect to the other, a connecting shank, and a differential clamp screw extending through said clamp arms and having external screw threads of two different pitches, those of one pitch acting upon one of said clamp arms and those of the other pitch acting upon the other of said clamp arms, substantially as specified.

4. In a press connection, the combination with a cross-head, of a clamp sleeve having clamp arms and furnished with screw threads of different pitches and one movable in respect to the other, a connecting shank, and a differential clamp screw extending through said clamp arms and having external screw threads of two different pitches, those of one pitch acting upon one of said clamp arms and those of the other pitch acting upon the other of said clamp arms, one of said clamp arms having a removable screw threaded bushing to receive the clamp screw, substantially as specified.

5. In a press connection, the combination with a cross-head, of a clamp sleeve having clamp arms and furnished with screw threads of different pitches and one movable in respect to the other, a connecting shank having a surrounding screw threaded sleeve and a differential clamp screw having external screw threads of two different pitches, those of one pitch acting upon one of said clamp arms, and those of the other pitch acting upon the other of said clamp arms, substantially as specified.

6. In a press connection, the combination with a cross-head, and a crank rod having an internally screw threaded clamp sleeve furnished with clamp arms and furnished with screw threads of different pitches and one movable in respect to the other, of a connecting shank having an externally screw threaded sleeve embraced by said clamp sleeve and a differential clamp screw extending through the clamp arms of said clamp sleeve and having external screw threads of two different pitches, those of one pitch acting upon one of said clamp arms and those of the other pitch acting upon the other of said clamp arms, substantially as specified.

7. In a press connection, the combination with a cross-head, and a crank rod having an internally screw threaded clamp sleeve furnished with clamp arms and furnished with screw threads of different pitches and one movable in respect to the other, of a connecting shank having an externally screw threaded sleeve embraced by said clamp sleeve and a differential clamp screw extending through the clamp arms of said clamp sleeve and having external screw threads of two different pitches, those of one pitch acting upon one of said clamp arms and those of the other pitch acting upon the other of said clamp arms, one of said clamp arms of the clamp sleeve having a removable screw threaded bushing, substantially as specified.

CHARLES J. NELSON.

Witnesses:
H. M. MUNDAY,
PEARL ABRAMS.